(12) United States Patent
Song (10) Patent No.: US 10,136,056 B2
(45) Date of Patent: Nov. 20, 2018

(54) PANORAMIC IMAGING APPARATUS AND SYSTEM, METHOD OF GENERATING PANORAMIC IMAGE USING PANORAMIC IMAGING SYSTEM, COMPUTER-READABLE RECORDING MEDIUM, AND COMPUTER PROGRAM STORED IN COMPUTER-READABLE RECORDING MEDIUM

(71) Applicant: TwoEyes Tech, Inc., Anyang-si, Gyeonggi-do (KR)

(72) Inventor: Hun Joo Song, Yongin-si (KR)

(73) Assignee: TwoEyes Tech, Inc., Anyang-si (KR)

( * ) Notice: Subject to any disclaimer, the term of this patent is extended or adjusted under 35 U.S.C. 154(b) by 19 days.

(21) Appl. No.: 15/442,317

(22) Filed: Feb. 24, 2017

(65) Prior Publication Data
US 2017/0289448 A1  Oct. 5, 2017

(30) Foreign Application Priority Data

Mar. 29, 2016 (KR) .......................... 10-2016-0037720

(51) Int. Cl.
*H04N 5/232* (2006.01)
*H04N 5/247* (2006.01)
*H04N 5/225* (2006.01)

(52) U.S. Cl.
CPC ....... *H04N 5/23238* (2013.01); *H04N 5/2252* (2013.01); *H04N 5/23245* (2013.01); *H04N 5/23293* (2013.01); *H04N 5/247* (2013.01)

(58) Field of Classification Search
CPC .............................. H04N 5/23238; G02B 13/06
See application file for complete search history.

(56) References Cited

U.S. PATENT DOCUMENTS

| 2002/0196330 A1* | 12/2002 | Park | G08B 13/19608 |
|---|---|---|---|
| | | | 348/49 |
| 2010/0045773 A1* | 2/2010 | Ritchey | G02B 13/06 |
| | | | 348/36 |

(Continued)

FOREIGN PATENT DOCUMENTS

| JP | 2006-121229 A | 5/2006 |
|---|---|---|
| JP | 2010-271675 A | 12/2010 |

(Continued)

*Primary Examiner* — Zhubing Ren
(74) *Attorney, Agent, or Firm* — Novick, Kim & Lee, PLLC; Sang Ho Lee (57) ABSTRACT

Provided are a panoramic imaging apparatus, a panoramic imaging system, a method of generating a panoramic image using the panoramic imaging system, a computer-readable recording medium, and a computer program stored in a computer-readable recording medium The panoramic imaging apparatus includes a first camera module capturing an omnidirectional image, a second camera module positioned a certain distance away from the first camera module and capturing an omnidirectional image, and a controller generating and storing an image frame based on the omnidirectional image captured by at least one of the first camera module and the second camera module Each of the first camera module and the second camera module includes two lenses having a viewing angle greater than or equal to 180°, sharing an optical axis, and formed to be convex in opposite directions of each other to capture the omnidirectional image.

14 Claims, 9 Drawing Sheets

(56) References Cited

U.S. PATENT DOCUMENTS

| | | | | |
|---|---|---|---|---|
| 2010/0053307 A1* | 3/2010 | Fang | .................. | H04N 13/0221 |
| | | | | 348/46 |
| 2010/0150457 A1* | 6/2010 | Angell | ................. | G06K 9/4661 |
| | | | | 382/224 |
| 2010/0271533 A1* | 10/2010 | Bogusky | .............. | H04N 1/2112 |
| | | | | 348/335 |
| 2014/0243596 A1* | 8/2014 | Yoon | .................. | A61B 1/00193 |
| | | | | 600/111 |

FOREIGN PATENT DOCUMENTS

| KR | 10-2006-0119103 A | 11/2006 |
|---|---|---|
| KR | 10-0944389 B1 | 3/2010 |
| KR | 10-2011-0043630 A | 4/2011 |
| KR | 10-2013-0057302 A | 5/2013 |
| KR | 10-2015-0146071 A | 12/2015 |
| WO | 2010/013733 A1 | 2/2010 |
| WO | 2012/002046 A1 | 1/2012 |

\* cited by examiner

PANORAMIC IMAGING APPARATUS AND SYSTEM, METHOD OF GENERATING PANORAMIC IMAGE USING PANORAMIC IMAGING SYSTEM, COMPUTER-READABLE RECORDING MEDIUM, AND COMPUTER PROGRAM STORED IN COMPUTER-READABLE RECORDING MEDIUM

CROSS-REFERENCE TO RELATED APPLICATION

This application claims the benefit of priority of Korean Patent Application No. 10-2016-0037720, filed on Mar. 29, 2016, in the Korean Intellectual Property Office, the disclosure of which is incorporated herein in its entirety by reference.

BACKGROUND

1. Field

One or more embodiments relate to a panoramic imaging apparatus, and more particularly, to a panoramic imaging apparatus including two camera modules.

2. Description of the Related Art

Generally, a virtual reality (VR) technology denotes a technology in which all senses of a user interact with each other in a three-dimensional (3D) virtual environment, which is generated to be similar to actual surroundings through a computer graphics technology, and immerses the user in a virtually created world to three dimensionally provide a virtual space to the user.

Recently, many technologies relating to a VR imaging device for creating VR images are being disclosed. For example, Korean Patent 10-0944389, which is related-art literature, discloses a one-shot panorama VR photographing device.

However, since the technology generates only one omnidirectional still-cut image per imaging operation, images corresponding to a left eye and a right eye are arbitrarily generated and displayed to create images displayed by a VR device. Therefore, when the images are viewed through a head mounted display (HMD), there is a problem in that it is not possible to provide accurate image quality.

Consequently, there is a necessity of a technology for solving the problem described above.

Meanwhile, the background technology described above is technical information that the present inventor has had in order to derive the present disclosure or has obtained in a process of deriving the present disclosure, and may not necessarily be a technology known to the public before application of the present disclosure.

SUMMARY

One or more embodiments provide a binocular still cut image suitable for a head mounted display (HMD) and a cardboard viewer by acquiring two omnidirectional images when actual space is imaged.

One or more embodiments may reduce fatigue of a user when the user views still cut images on a virtual reality (VR) device by generating a still cut image optimized for a left eye using information on an omnidirectional image captured by a first camera module and generating a still cut image optimized for a right eye using information on an omnidirectional image captured by a second camera module.

One or more embodiments may generate any one of a binocular still cut image and a monocular still cut image according to a selection of a user.

According to any one of the above-described solutions of the present disclosure, an embodiment of the present disclosure may reduce the amount of data transferred from a panoramic imaging apparatus to an image processor by including image information of a subject whose images are formed on four imaging sections in one image frame and transferring the image frame to the image processor.

An embodiment of the present disclosure may reduce the amount of resources for generating a still cut image by including image information of a subject whose images are formed on four imaging sections in one image frame so that synchronization is not required when an image processor generates a still cut image.

Additional aspects will be set forth in part in the description which follows and, in part, will become apparent from the description, or may be learned by practice of the presented embodiments.

According to one or more embodiments, a panoramic imaging apparatus includes: a first camera module configured to capture an omnidirectional image; a second camera module configured to be positioned a certain distance away from the first camera module and capture an omnidirectional image; and a controller configured to generate and store an image frame based on the omnidirectional image captured by at least one of the first camera module and the second camera module, wherein each of the first camera module and the second camera module includes two lenses having a viewing angle greater than or equal to 180°, sharing an optical axis, and formed to be convex in opposite directions to capture the omnidirectional image.

According to one or more embodiments, a panoramic imaging system for generating a panoramic image using the panoramic imaging apparatus further includes an image processor configured to receive an image frame generated by the panoramic imaging apparatus from the panoramic imaging apparatus.

According to one or more embodiments, a method of generating a panoramic image using a panoramic imaging system includes: receiving, by a panoramic imaging apparatus, an operation mode; acquiring, by the panoramic imaging apparatus, an image; and generating a still cut image.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the accompanying drawings so that those of ordinary skill in the art may easily implement the embodiments. However, this disclosure may be embodied in different forms and is not to be construed as limiting to the embodiments set forth herein. In the drawings, content irrelevant to the description will be omitted to clearly describe the present disclosure, and the same elements will be designated by the same reference numerals throughout the specification.

Throughout the specification, when a part is described as being "connected" to another part, the part may be "directly connected" to the other part or "indirectly connected" thereto. Also, when a part is described as "including" an element, the part is not precluded from including other elements and may further include other elements unless the context dictates otherwise. As used herein, the term "and/or" includes any and all combinations of one or more of the associated listed items. Expressions such as "at least one of," when preceding a list of elements, modify the entire list of elements and do not modify the individual elements of the list.

The present disclosure will be described in detail below with reference to the accompanying drawings.

Prior to description of the present disclosure, meanings of terms used below will be defined first.

In the drawings, each element may be exaggerated, omitted, or schematically illustrated for the sake of convenience and clarity of description. A size of each of the elements does not fully reflect an actual size. When an element is described as being formed "on" or "under" another element, the element may be formed directly or indirectly on or under the other element. "On" or "under" will be described with reference to a drawing.

When describing each element, the term "front" or "rear" denotes a position of the element with respect to a cleaning target in each drawing, and does not denote that the actual position is at a "front" or "rear" side.

In the present disclosure, a still cut image is an image of a still frame showing omnidirectional image information. A still cut image includes an image and a video. A monocular still cut image is a still cut image generated under the assumption that a user sees in all directions with one eye, and a binocular still cut image is a still cut image generated under the assumption that the user sees in all directions with both eyes corresponding to a left eye and a right eye of the user.

In the present disclosure, a first mode is an operation mode in which a panoramic imaging system generates a binocular still cut image, and a second mode is an operation mode in which a panoramic imaging system generates a monocular still cut image.

The present disclosure will be described in detail below with reference to the accompanying drawings.

Figure 1:
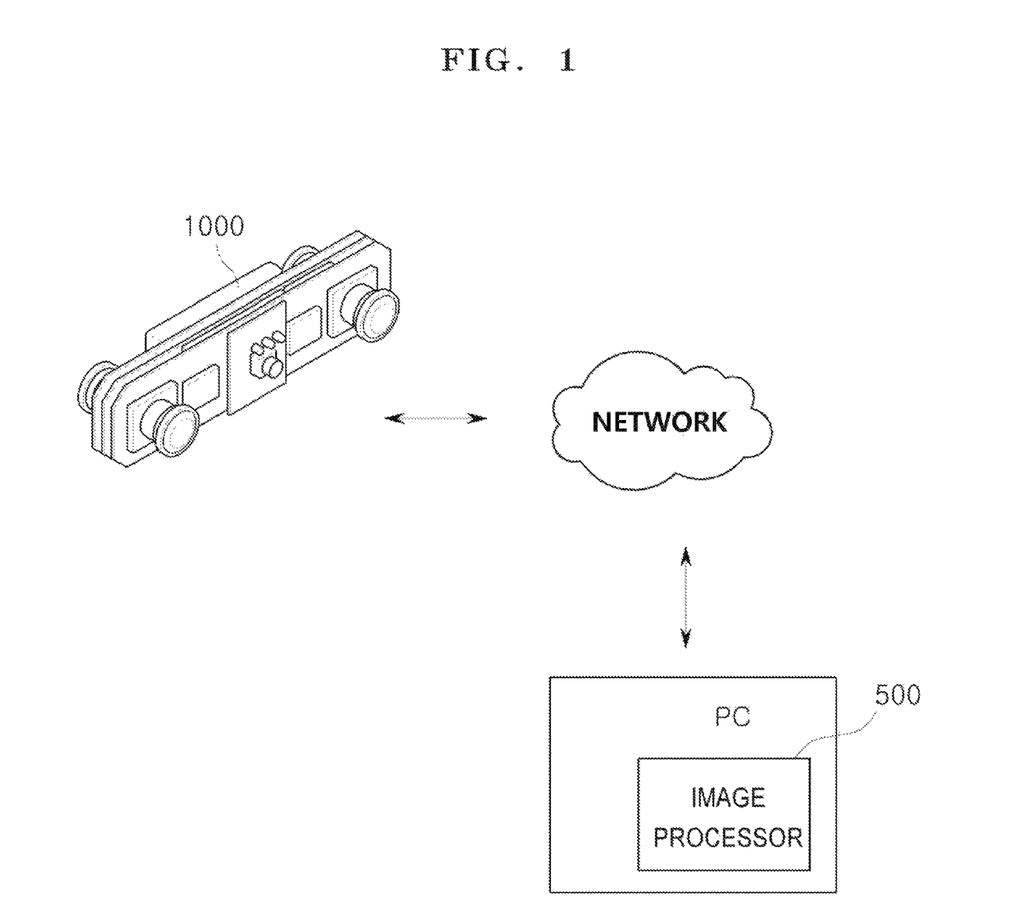
FIG. 1 is a diagram showing each component of a panoramic imaging system according to an embodiment of the present disclosure.
Figure 2:
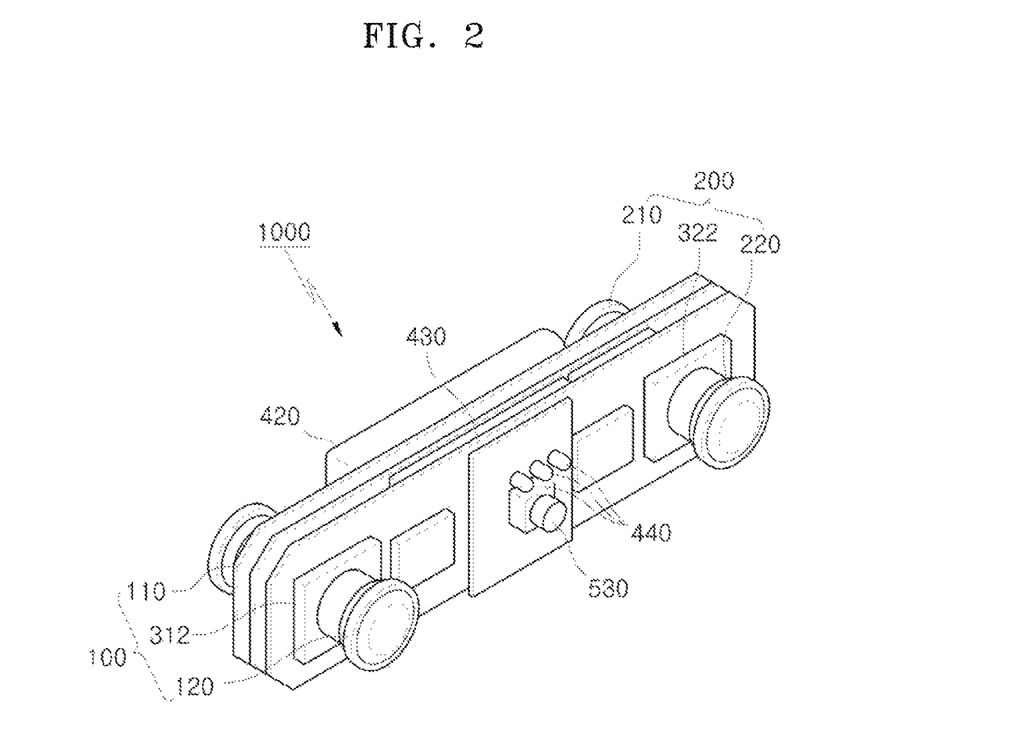
FIG. 2 is a diagram showing each component of a panoramic imaging apparatus according to an embodiment of the present disclosure.
Figure 3:
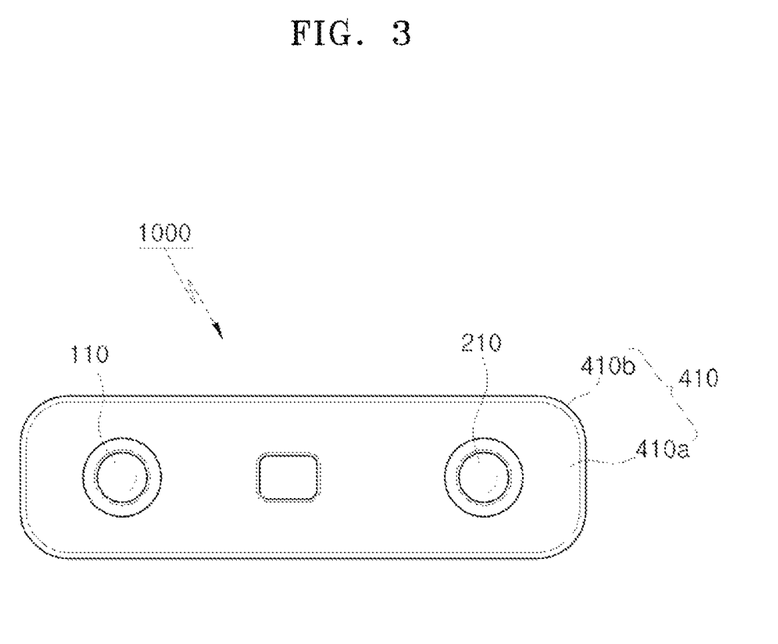
FIG. 3 is a diagram showing an arrangement of the panoramic imaging apparatus which generates a binocular still cut image in a first mode.
Figure 4:
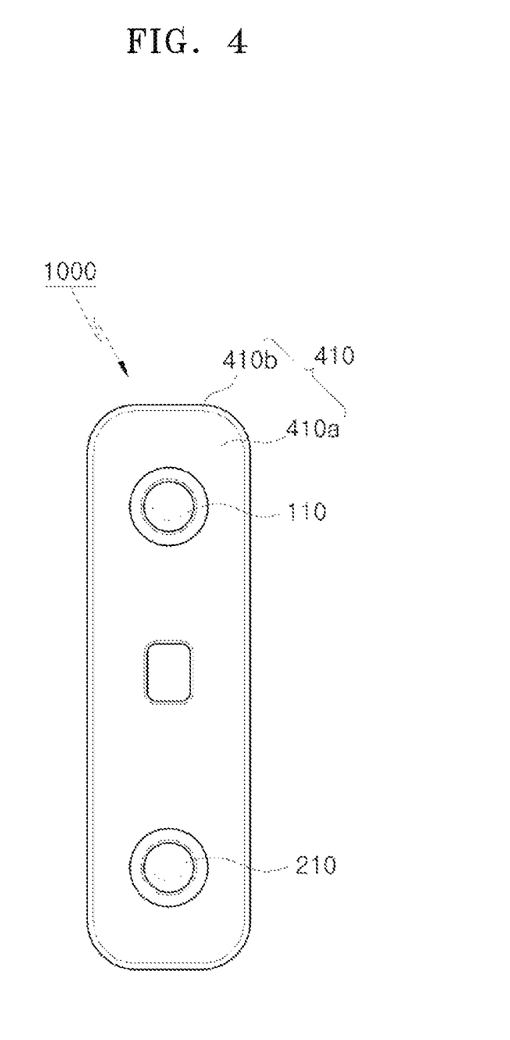
FIG. 4 is a diagram showing an arrangement of the panoramic imaging apparatus which generates a monocular still cut image in a second mode.

FIG. 1 is a diagram showing each component of a panoramic imaging system according to an embodiment of the present disclosure, and FIG. 2 is a diagram showing each component of a panoramic imaging apparatus 1000 according to an embodiment of the present disclosure. FIG. 3 is a diagram showing an arrangement of the panoramic imaging apparatus 1000 which generates a binocular still cut image in the first mode, and FIG. 4 is a diagram showing an arrangement of the panoramic imaging apparatus 1000 which generates a monocular still cut image in the second mode.

The panoramic imaging system captures a plurality of images or videos using respective lenses 110, 120, 210, and 220 included in the panoramic imaging apparatus 1000 and generates an image or a video having a 360° viewing angle.

Referring to FIG. 1, the panoramic imaging system includes the panoramic imaging apparatus 1000, and may additionally include a PC or the like in which an image processor 500 is embedded. Therefore, any component in which the image processor 500 may be embedded may replace the PC.

The panoramic imaging apparatus 1000 and the image processor 500 may be implemented as a computer, a portable terminal, a wearable device, a short-range communication device, etc. that may be connected to a remote server via a network or another component and a server. Here, the computer includes, for example, a desktop, a laptop, etc. in which a web browser is installed, and the portable terminal is a wireless communication device with portability and mobility and may include any type of handheld wireless communication device, such as a personal communication system (PCS) device, a personal digital cellular (PDC) device, a personal handyphone system (PHS) device, a personal digital assistant (PDA) device, a global system for mobile communications (GSM) device, an international mobile telecommunication (IMT)-2000 device, a code division multiple access (CDMA)-2000 device, a wideband CDMA (W-CDMA) device, a wireless broadband Internet (WiBro) device, a smart phone, a mobile worldwide interoperability for microwave access (WiMAX) device, etc. The wearable device is an information processing device, for example, a watch, glasses, an accessary, clothes, shoes, etc., that may be directly worn on a human body, and may be connected to another control device or a remote server via a network directly or through another information processing device. Also, the network may be any type of wired/wireless network, such as a wide area network (WAN), a value added network (VAN), a personal area network (PAN), a mobile radio communication network, a wireless broadband Internet (WiBro) network, a mobile WiMAX network, a high speed downlink packet access (HSDPA) satellite communication network, a long term evolution (LTE) network, a wireless local area network (WLAN), and networks based on short-range communication protocols including Bluetooth, ZigBee, and near field communication (NFC).

Each component of the panoramic imaging system will be described below.

The panoramic imaging apparatus 1000 according to an embodiment of the present disclosure may include a first camera module 100 and a second camera module 200.

Each of the first camera module 100 and the second camera module 200 is a component that acquires image information of a subject for generating a 360° still cut image and generates an image frame using the acquired image information.

The first camera module 100 and the second camera module 200 according to an embodiment of the present disclosure may be positioned a certain distance away from each other. The first camera module 100 may include first lenses 110 and 120, and the second camera module may include second lenses 210 and 220. Each of the first camera module 100 and the second camera module 200 may acquire omnidirectional image information of the subject through the lenses.

In detail, the first camera module 100 may include the first lenses 110 and 120 having a viewing angle greater than or equal to 180°. The second camera module 200 also may include the second lenses 210 and 220 having a viewing angle greater than or equal to 180°. The lenses included in each of the camera modules 100 and 200 are formed to be convex in opposite directions and share an optical axis with each other so that omnidirectional image information of the subject may be acquired without distortion.

As shown in FIG. 2, the first camera module 100 includes the first front lens 110 and the first rear lens 120, which are formed to be convex in opposite directions and share an optical axis. Also, the second camera module 200 includes the second front lens 210 and the second rear lens 220, which are formed to be convex in opposite directions and share an optical axis.

Meanwhile, the panoramic imaging apparatus 1000 is continuously fixed at a preset position while the first camera module 100 and the second camera module 200 perform omnidirectional imaging. Also, continuous power supply enables stable imaging.

Therefore, the panoramic imaging apparatus 1000 may include a housing 410 that fixes positions of the first camera module 100 and the second camera module 200, and a battery 420 may be included in the housing 410.

In detail, the housing 410 may include a front housing 410a and a rear housing (not shown) which are parallel to each other, and a lateral housing 410b which extends from an edge of the front housing 410a to a corresponding edge of the rear housing to seal the front housing 410a and the rear housing. Also, the battery 420 is disposed between the first camera module 100 and the second camera module 200 in the housing 410 and supplies power to each component of the panoramic imaging apparatus 1000.

In detail, for example, lens fixing holes (not shown) may be formed at positions corresponding to each other in the front housing 410a and the rear housing. Since each of the lenses included the first camera module 100 and the second camera module 200 is put in a lens fixing hole, the first camera module 100 and the second camera module 200 may be fixed between the front housing 410a and the rear housing. Also, the lateral housing 410b which extends from the edge of the front housing 410a to the corresponding edge of the rear housing is disposed between the front housing 410a and the rear housing so that the first camera module 100 and the second camera module 200 are completely sealed except the lenses. Therefore, the panoramic imaging apparatus 1000 may form images on imaging sections 311, 312, 321, and 322 through only the lenses included in the first camera module 100 and the second camera module 200, and the positions of the first camera module 100 and the second camera module 200 are fixed to enable stable imaging.

Also, when relative positions between the first camera module 100 and the second camera module 200 are fixed, it is necessary for a position of the panoramic imaging apparatus 1000 itself to be fixed so that stable imaging is enabled. Therefore, the panoramic imaging apparatus 1000 according to an embodiment of the present disclosure may include a set screw (not shown) in order to be fixed on a tripod.

The set screw (not shown) may be engaged with a fixing hole of a tripod to fix the position of the panoramic imaging apparatus 1000, and may be disposed at a position corresponding to an operation mode of the panoramic imaging apparatus 1000, that is, a certain position in the housing 410.

For example, in the first mode, the first camera module 100 and the second camera module 200 are positioned at the same height from the ground, and the tripod under the panoramic imaging apparatus 1000 fixes the position of the panoramic imaging apparatus 1000. Therefore, the set screw may be disposed at a lower portion of the lateral housing 410b between the first camera module 100 and the second camera module 200.

In the second mode, the first camera module 100 and the second camera module 200 are positioned vertically with respect to the ground, and the tripod fixes the position of the panoramic imaging apparatus 1000 under the panoramic imaging apparatus 1000. Therefore, the set screw may be disposed on an extended straight line connecting the first camera module 100 and the second camera module 200 in the lateral housing 410b.

Meanwhile, the operation mode of the panoramic imaging apparatus 1000 may be switched by an input of the user or a preset condition.

In detail, the panoramic imaging apparatus 1000 may include a sensor section 530 which may switch a mode of the panoramic imaging apparatus 1000. The sensor section 530 may be configured with a sensor which may sense an input of the user, or a gyro sensor which may determine whether the sensor section 530 is tilted toward a particular axis.

For example, the sensor section 530 may sense whether the first camera module 100 and the second camera module 200 are positioned at the same height from the ground. In detail, the sensor section 530 may be implemented as a gyro sensor which determines an angular change with respect to three axes. The gyro sensor may determine whether an axis parallel to the extended straight line connecting the first camera module 100 and the second camera module 200 among the three axes sensed by the gyro sensor is parallel to the ground, and may determine that the first camera module 100 and the second camera module 200 are at the same height when the axis is parallel to the ground.

In another example, the sensor section 530 may be implemented in the form of a button which recognizes an input of the user, and may sense the number of times that the user presses the sensor section 530 and transfer the number of times to a controller 400. Also, the sensor section 530 may be implemented in the form of an input window which recognizes an input of the user.

The aforementioned examples are merely an embodiment of the present disclosure, and the present disclosure is not limited thereto.

Each configuration for generating an image frame using incident light which is incident through each of the lenses 110, 120, 210, and 220 will be described below.

Figure 5:
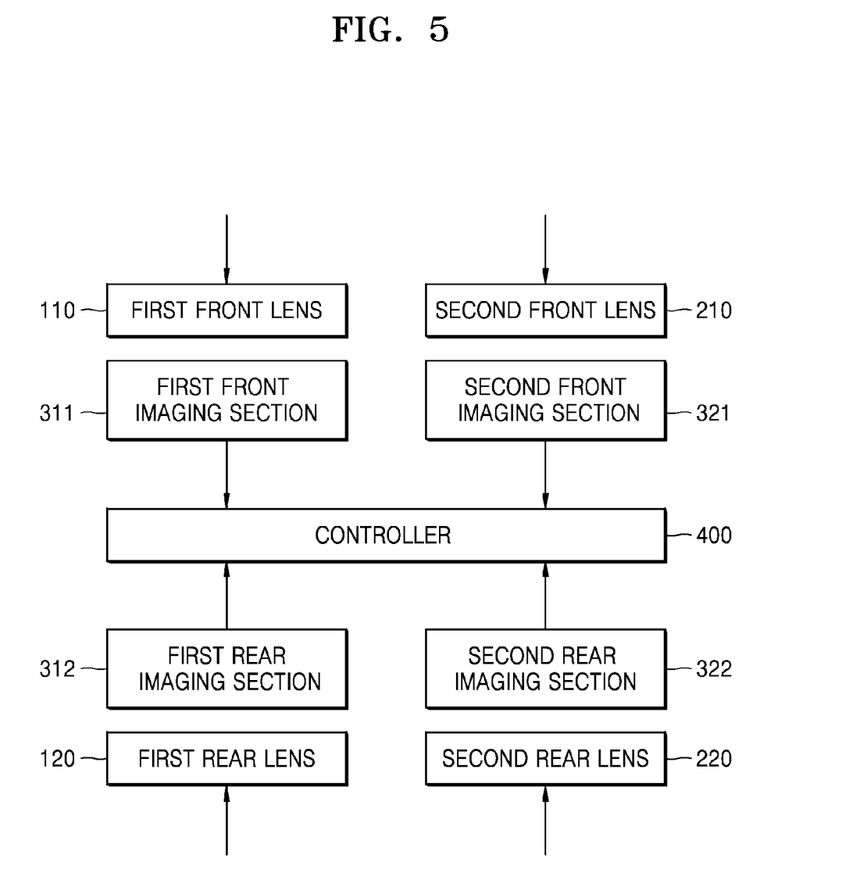
FIG. 5 is a diagram illustrating generation of an image frame in the panoramic imaging apparatus in the first mode.
Figure 6:
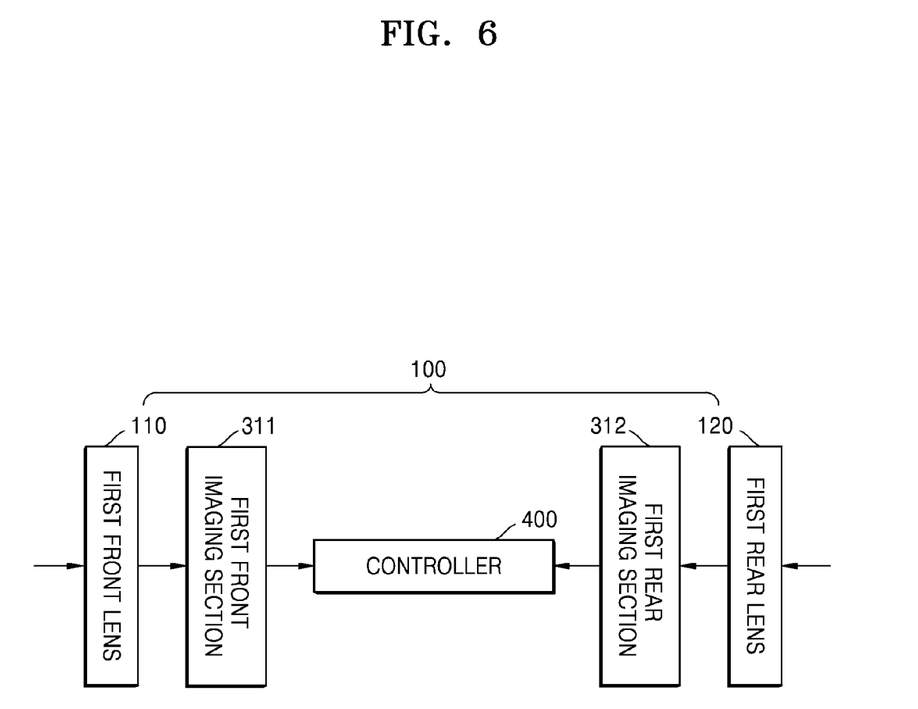
FIG. 6 is a diagram illustrating generation of an image frame in the panoramic imaging apparatus in the second mode.
Figure 7:
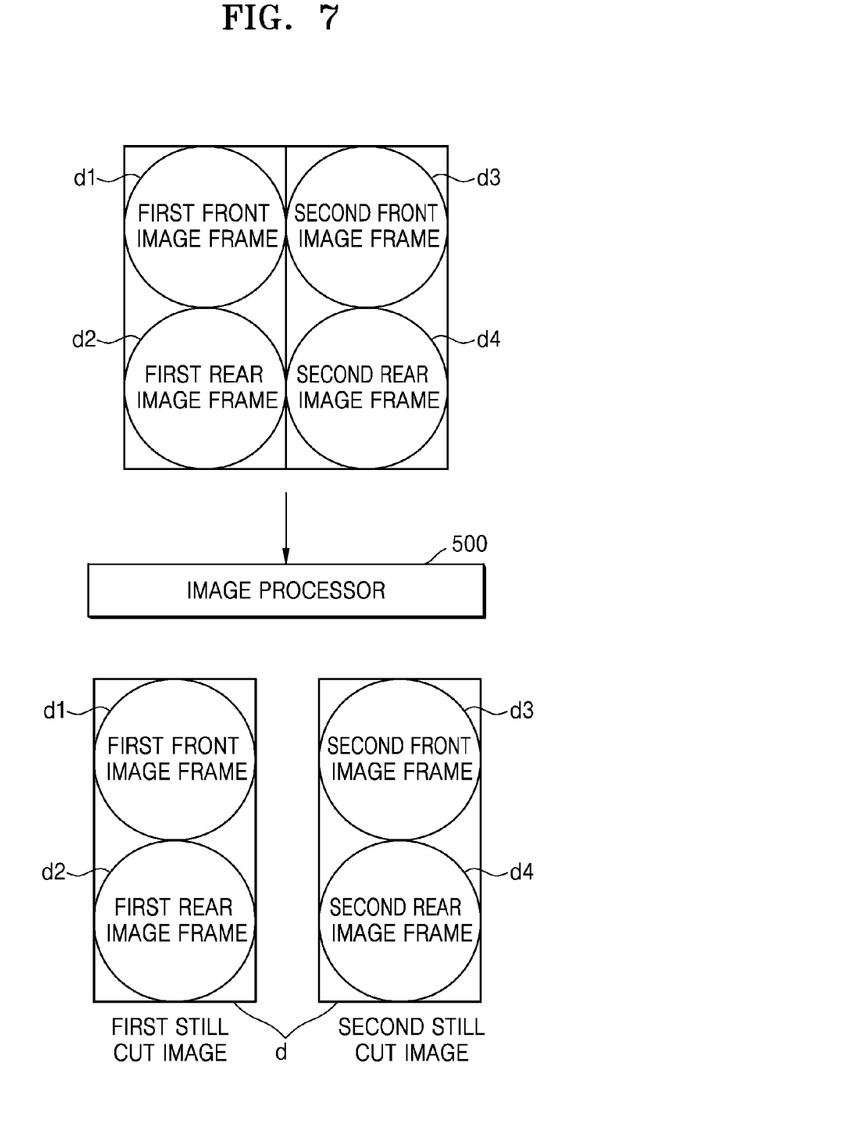
FIG. 7 is a diagram illustrating a binocular still cut image generated by the panoramic imaging system in the first mode.
Figure 8:
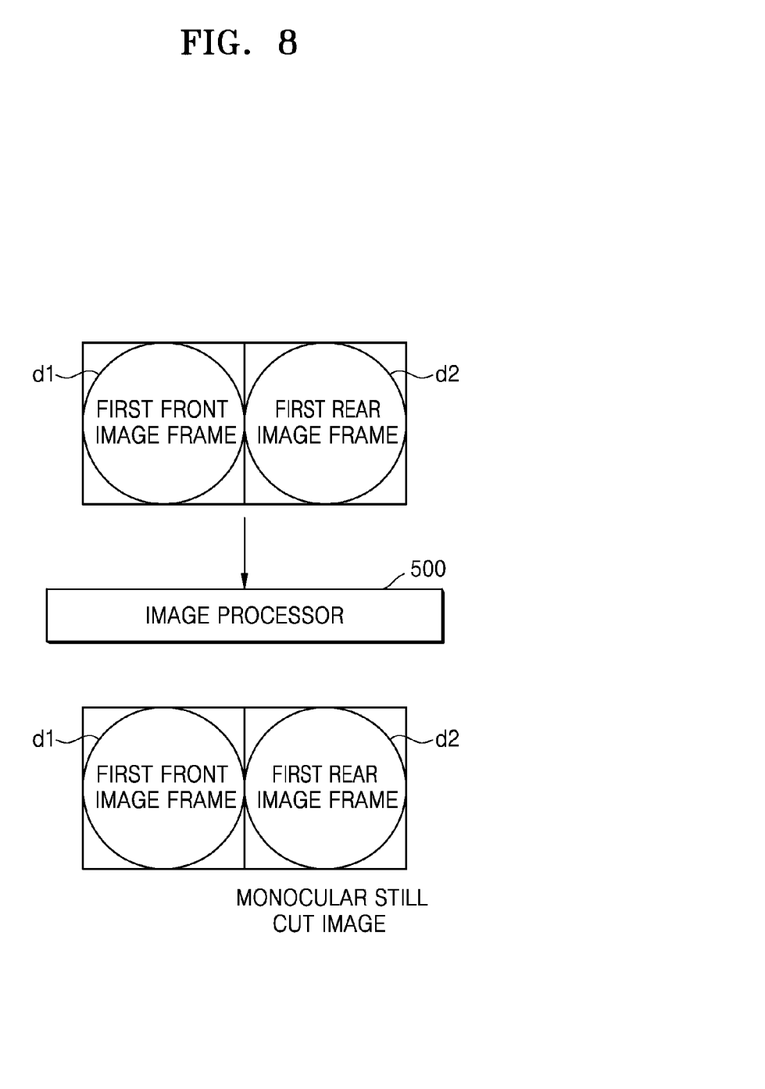
FIG. 8 is a diagram illustrating a monocular still cut image generated by the panoramic imaging system in the second mode.

FIG. 5 is a diagram illustrating generation of an image frame by the panoramic imaging apparatus in the first mode, and FIG. 6 is a diagram illustrating generation of an image frame by the panoramic imaging apparatus in the second mode. FIG. 7 is a diagram illustrating a binocular still cut image generated by the panoramic imaging system in the first mode, and FIG. 8 is a diagram illustrating a monocular still cut image generated by the panoramic imaging system in the second mode.

The first camera module 100 may include the first imaging sections 311 and 312, and the second camera module 100 may include the second imaging sections 321 and 322.

The imaging sections 311, 312, 321, and 322 are components that acquire image information of the subject from light incident through the lenses 110, 120, 210, and 220 included in the first camera module 100 and the second camera module 200.

The imaging sections 311, 312, 321, and 322 are respectively positioned to correspond to the lenses 110, 120, 210, and 220 and may acquire information of images of the subject formed by the respective lenses 110, 120, 210, and 220. In detail, each of the imaging sections 311, 312, 321, and 322 may acquire information on an image of the subject formed by the corresponding lens 110, 120, 210, or 220.

As shown in FIG. 5, the first front imaging section 311 is positioned to correspond to the first front lens 110 and acquires information on an image of the subject formed by the first front lens 110, and the first rear imaging section 312 is positioned to correspond to the first rear lens 120 and acquires information on an image of the subject formed by the first rear lens 120. Also, the second front imaging section 321 is positioned to correspond to the second front lens 210 and acquires information on an image of the subject formed by the second front lens 210, and the second rear imaging section 322 is positioned to correspond to the second rear lens 220 and acquires information on an image of the subject formed by the second rear lens 220.

Meanwhile, the panoramic imaging apparatus 1000 may further include the controller 400.

The controller 400 is a component that controls the overall operation of the panoramic imaging apparatus 1000 and generates and stores an image frame based on an omnidirectional image captured by at least one of the first camera module 100 and the second camera module 200.

Before generating the image frame, the controller 400 may switch the operation mode of the panoramic imaging apparatus 1000 to any one of the first mode and the second mode.

In detail, when the sensor section 530 senses an input of the user or that a preset condition is satisfied, the controller 400 may switch the operation mode of the panoramic imaging apparatus 1000 to any one of the first mode and the second mode based on the sensing result.

For example, when the sensor section 530 senses that the first camera module 100 and the second camera module 200 are positioned at the same height from the ground, the controller 400 may switch the operation mode of the panoramic imaging apparatus 1000 to the first mode. Also, when the sensor section 530 senses that the first camera module 100 and the second camera module 200 are not positioned at the same height from the ground, the controller 400 may switch the operation mode of the panoramic imaging apparatus 1000 to the second mode.

In another example, if the sensor section 530 is formed as a button, the controller 400 may switch the operation mode of the panoramic imaging apparatus 1000 to the first mode when the user presses the sensor section 530 an odd number of times, and may switch the operation mode of the panoramic imaging apparatus 1000 to the second mode when the user presses the sensor section 530 an even number of times.

Meanwhile, the panoramic imaging apparatus 1000 may include a light emitter 440 to notify the user of the operation mode of the panoramic imaging apparatus 1000. In detail, the light emitter 440 may be a component that emits a particular color of light when supplied with power, for example, a light-emitting diode (LED) and the like.

For example, the light emitter 440 may emit green light when the controller 400 switches the operation mode of the panoramic imaging apparatus 1000 to the first mode, and may emit red light when the controller 400 switches the operation mode of the panoramic imaging apparatus 1000 to the second mode.

As shown in FIG. 2, the panoramic imaging apparatus 1000 includes three light emitters 440, and each of the light emitters 440 may emit a unique color of light. A light emitter 440 which emits green light is supplied with power when the panoramic imaging apparatus 1000 is switched to the first mode, and a light emitter 440 which emits red light is supplied with power when the panoramic imaging apparatus 1000 is switched to the second mode. In this way, the user may see which camera module 100 or 200 is currently operating.

Meanwhile, the controller 400 may generate and store an image frame using the image information of the subject acquired by at least one of the first imaging sections 311 and 312 included in the first camera module 100 and the second imaging sections 321 and 322 included in the second camera module 200 based on the operation mode of the panoramic imaging apparatus 1000.

For example, when the panoramic imaging apparatus 1000 operates in the first mode, the controller 400 according to an embodiment of the present disclosure may generate one image frame using all of the image information of the subject acquired by the first imaging sections 311 and 312 and the second imaging sections 321 and 322. As shown in FIG. 7, the controller 400 generates a first front image frame d1 using information on an image of the subject formed on the first front imaging section 311 by the first front lens 110, generates a first rear image frame d2 using information on an image of the subject formed on the first rear imaging section 312 by the first rear lens 120, generates a second front image frame d3 using information on an image of the subject formed on the second front imaging section 321 by the second front lens 210, and generates a second rear image frame d4 using information on an image of the subject formed on the second rear imaging section 322 by the second rear lens 220. The controller 400 generates one image frame based on the first front image frame, the first rear image frame, the second front image frame, and the second rear image frame.

Also, when the panoramic imaging apparatus 1000 operates in the second mode, one image frame may be generated using the image information of the subject acquired by any one of the first camera module 100 and the second camera module 200. Here, the camera module that acquires the image information of the subject may be set in advance.

In detail, the panoramic imaging apparatus 1000 may be set so that a camera module that generates an image frame to acquire image information of the subject is determined based on the relative positions of the first camera module 100 and the second camera module 200. For example, the panoramic imaging apparatus 1000 may be set in advance to generate one image frame using image information of the subject acquired by whichever one of the first camera module 100 and the second camera module 200 that is at a higher position from the ground.

As shown in FIG. 8, the first camera module 100 generates an image frame under a preset condition. The controller 400 generates a first front image frame using information on an image of the subject formed on the first front imaging section 311 by the first front lens 110, generates a first rear image frame using information on an image of the subject formed on the first rear imaging section 312 by the first rear lens 120, and generates one image frame based on the first front image frame and the first rear image frame.

The example described above is merely an embodiment of the present disclosure, and the present disclosure is not limited thereto.

The image processor 500 that generates a still cut image using an image frame will be described below.

The panoramic imaging system according to an embodiment of the present disclosure includes the image processor 500.

The image processor 500 is a component that generates a monocular or binocular still cut image using an image frame generated by the panoramic imaging apparatus 1000.

The image processor 500 may be included in a computer or a portable terminal. The image processor 500 may receive an image frame generated by the panoramic imaging apparatus 1000 and generate a still cut image using image information of a subject included in the image frame.

In detail, since the image information of the subject acquired by the four imaging sections 311, 312, 321, and 322 is included in an image frame received by the image processor 500 in the first mode, the image information of the subject included in the image frame is classified according to the camera modules that acquired the image information. As shown in FIG. 7, the first front image frame and the first rear image frame among the classified pieces of image information have duplicate parts, the image processor 500 joins the two pieces of image information together so that the duplicate parts of the two image frames overlap each other to generate a first still cut image. Also, the second front image frame and the second rear image frame among the classified pieces of image information have duplicate parts, and the image processor 500 joins the two pieces of image information together so that the duplicate parts of the two pieces of image information overlap each other to generate a second still cut image.

The image processor 500 processes the first still cut image and the second still cut image generated from the information on images formed at the same time to be simultaneously displayed by a virtual reality (VR) device or the like so that a binocular still cut image d is generated.

Also, in the second mode, image information of a subject acquired by the first imaging sections 311 and 312 or the second imaging sections 321 and 322 is included in an image frame received by the image processor 500, and the acquired pieces of image information have duplicate parts. The image processor 500 joins the two pieces of image information together so that the duplicate parts of the two pieces of image information overlap each other to generate a monocular still cut image.

As shown in FIG. 8, the image processor 500 generates a monocular still cut image using the image information of the subject acquired by the first camera module 100 and including the first front image frame d1 and the first rear image frame d2 which are generated using the image information of the subject acquired by the first imaging sections 311 and 312.

A method of generating a panoramic image using a panoramic imaging system will be described below.

Figure 9:
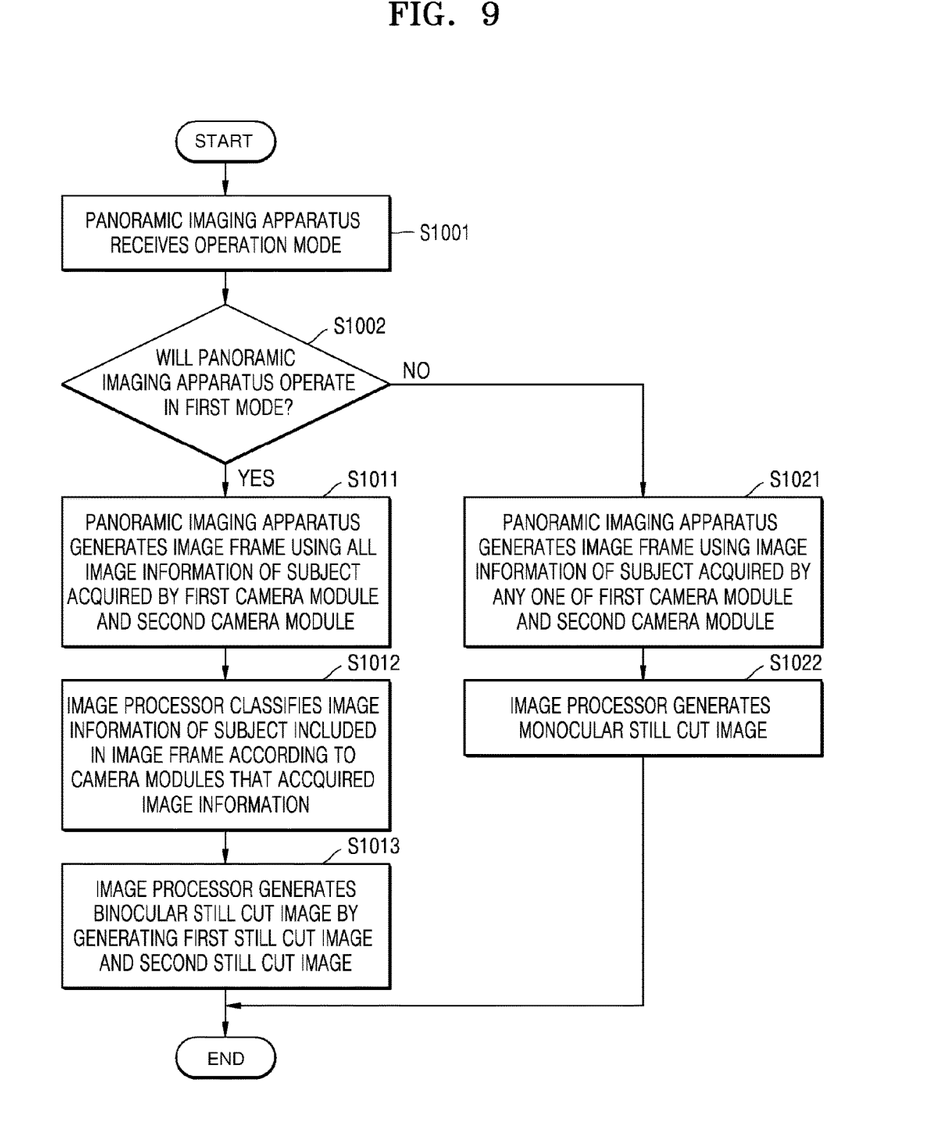
FIG. 9 is a flowchart illustrating a method of generating a panoramic image in a panoramic imaging system.

FIG. 9 is a flowchart illustrating a method of generating a panoramic image using the panoramic imaging system.

The method of generating a panoramic image using the panoramic imaging system according to an embodiment illustrated in FIG. 9 includes operations that are processed in a time-series manner by the panoramic imaging system shown in FIGS. 1 to 8. Therefore, although omitted below, the above-described content of the method of generating a panoramic image using the panoramic imaging system shown in FIGS. 1 to 8 may also be applied to the method of generating a panoramic image according to the embodiment illustrated in FIG. 9.

The panoramic imaging apparatus 1000 may include the first camera module 100 that captures an omnidirectional image, and the second camera module 200 that is positioned a certain distance away from the first camera module 100 and captures an omnidirectional image. Before starting imaging or during the imaging, the panoramic imaging apparatus 1000 continuously receives an operation mode (S1001). An operation mode of the panoramic imaging apparatus 1000 may be determined according to a direct input of a user or a preset condition.

For example, the panoramic imaging apparatus 1000 may switch to the first mode when the first camera module 100 and the second camera module 200 are positioned at the same height from the ground, and may switch to the second mode when the first camera module 100 and the second camera module 200 are not positioned at the same height from the ground.

In another example, the sensor section 530 may be implemented in the form of a button which recognizes an input of the user, and the panoramic imaging apparatus 1000 may determine the operation mode thereof based on the number of times that the user presses the sensor section 530.

In still another example, the panoramic imaging apparatus 1000 may receive an input of the user through an input window, and the operation mode of the panoramic imaging apparatus 1000 may be switched based on information input by the user.

After receiving the operation mode, the panoramic imaging apparatus 1000 may determine whether to operate in the first mode (S1002). The panoramic imaging apparatus 1000 may generate one image frame based on image information of a subject acquired by at least one of the first camera module 100 and the second camera module 200.

For example, when the panoramic imaging apparatus 1000 operates in the first mode, a still cut image for a left eye and a still cut image for a right eye are necessary. In an embodiment of the present disclosure, the first imaging sections 311 and 312 and the second imaging sections 321 and 322 may separately acquire image information for generating one still cut image, and thus the panoramic imaging apparatus 1000 may generate one image frame using all image information of the subject acquired by the first camera module 100 and the second camera module 200 in the first mode (S1011).

Also, when the panoramic imaging apparatus 1000 operates in the second mode, one of the still cut image for the left eye and the still cut image for the right eye is necessary. Therefore, in the second mode, one image frame may be generated using the image information of the subject acquired by any one of the first camera module 100 and the second camera module 200 (S1021). A camera module that acquires the image information of the subject at this time may be set in advance. For example, one image frame may be generated using the image information of the subject acquired by whichever one of the first camera module 100 and the second camera module 200 that is at a higher position from the ground.

When the image frame is generated by the panoramic imaging apparatus 1000, the image processor 500 receives the image frame. Then, the image processor 500 generates a still cut image from the image frame in a way that corresponds to either of the operation modes.

In detail, it is necessary to generate a binocular still cut image in the case of the first mode. Therefore, the image processor 500 classifies image information of the subject included in the image frame according to the camera modules that have acquired the image information (S1012). A first still cut image is generated using the image information acquired by the first camera module 100 among the classified pieces of image information, and a second still cut image is generated using the image information acquired by the second camera module 200. In detail, in the first mode, the image processor 500 classifies the image information of the subject included in the image frame according to the camera modules that have acquired the image information. Two pieces of image information acquired by the first camera module 100 among the classified pieces of image information have duplicate parts, and the image processor 500 joins the two pieces of image information together so that the duplicate parts of the two pieces of image information overlap each other to generate the first still cut image. Also, the image information acquired by the second camera module 200 among the classified pieces of image information have duplicate parts, and the image processor 500 joins the two pieces of image information together so that the duplicate parts of the two pieces of image information overlap each other to generate the second still cut image.

The image processor 500 processes the first still cut image and the second still cut image generated from the information of images formed at the same time to be simultaneously displayed by a VR device and the like to generate a binocular still cut image (S1013).

On the other hand, in the case of the second mode, the image processor 500 generates a monocular still cut image using all image information of the subject included in the image frame (S1022).

In the second mode, the image information of the subject acquired by the first camera module 100 and the second camera module 200 is included in the image frame received by the image processor 500, and the acquired pieces of the image information have duplicate parts. The image processor 500 joins the two pieces of image information together so that the duplicate parts of the two pieces of image information overlap each other to generate a monocular still cut image.

The method of generating a panoramic image using the panoramic imaging system according to the embodiment illustrated in FIG. 9 may be implemented in the form of a computer-readable medium including computer-executable instructions, such as a program module executed by a computer. The computer-readable medium may be any available medium that may be accessed by a computer, and includes any volatile, non-volatile, removable, and non-removable media. Also, the computer-readable medium may include any computer storage medium and communication medium. The computer storage medium includes any volatile, non-volatile, removable, and non-removable media that are implemented by any method or technology for storing information, such as computer-readable instructions, data structures, program modules, or other types of data. The communication medium normally includes computer-readable instructions, data structures, program modules, other types of data of a modulated data signal, such as a carrier, or data of other transmission mechanisms, and includes any type of information transfer medium.

Furthermore, the method of generating a panoramic image using the panoramic imaging system according to an embodiment of the present disclosure may be implemented as a computer program (or a computer program product) including computer-executable instructions. The computer program includes programmable machine instructions that are processed by a processor, and may be implemented in a high-level programming language, an object-oriented programming language, an assembly language, a machine language, or the like. Also, the computer program may be stored in a tangible computer-readable storage medium (e.g., a memory, a hard disk, a magnetic/optical medium, a solid-state drive (SSD), or the like).

Accordingly, the method of generating a panoramic image using the panoramic imaging system according to an embodiment of the present disclosure may be implemented in such a manner that the above-described computer program is executed by a computing apparatus. The computing apparatus may include at least some of a processor, a memory, a storage device, a high-speed interface connected to the memory and a high-speed expansion port, and a low-speed interface connected to a low-speed bus and the storage device. These elements are connected using various buses, and may be mounted on a common motherboard or installed in another appropriate way.

Here, the processor may process instructions within the computing apparatus. Examples of the instructions are instructions that are stored in a memory or a storage device to display graphic information for providing a graphical user interface (GUI) on an external input/output device, such as a display connected to a high-speed interface. In another embodiment, a plurality of processors and/or a plurality of buses may be appropriately used along with a plurality of types of memories. Also, the processor may be implemented as a chipset composed of chips including a plurality of independent analog and/or digital processors.

The memory stores information within the computing apparatus. For example, the memory may include a volatile memory unit or a set of volatile memory units. In another example, the memory may include a non-volatile memory unit or a set of non-volatile memory units. Also, the memory may be another type of computer-readable medium, such as a magnetic or optical disk.

The storage device may provide a large storage space to the computing apparatus. The storage device may be a computer-readable medium or a component including a computer-readable medium. For example, the storage device may also include devices within a storage area network (SAN) or other components, and may be a floppy disk device, a hard disk device, an optical disk device, a tape device, a flash memory, or a similar semiconductor memory device or array.

According to any one of the above-described solutions of the present disclosure, an embodiment of the present disclosure may acquire two omnidirectional images when actual space is imaged and provide a binocular still cut image suitable for a head mounted display (HMD) and a cardboard viewer.

According to any one of the above-described solutions of the present disclosure, since an embodiment of the present disclosure may generate a still cut image optimized for a left eye using omnidirectional image information obtained by a first camera module and generate a still cut image optimized for a right eye using omnidirectional image information obtained by a second camera module, it is possible to reduce fatigue of a user when the still cut images are viewed in a VR device.

According to any one of the above-described solutions of the present disclosure, an embodiment of the present disclosure may generate any one of a binocular still cut image and a monocular still cut image according to a selection of a user.

According to any one of the above-described solutions of the present disclosure, since an embodiment of the present disclosure includes image information of a subject whose images are formed on four imaging sections in one image frame and transfers the image frame to an image processor, it is possible to reduce the amount of data transferred from a panoramic imaging apparatus to the image processor.

According to any one of the above-described solutions of the present disclosure, since an embodiment of the present disclosure includes image information of a subject whose images are formed on the four imaging sections in one image frame so that synchronization is not required when the image processor generates a still cut image, it is possible to reduce resources for generating a still cut image.

The above description of the present disclosure is illustrative in purpose and it will be understood that those of ordinary skill in the art to which the present disclosure pertains may easily make modifications and variations thereto without departing from the technical spirit and essential features of the present disclosure. Therefore, the above-described embodiments are illustrative in all aspects, and are not limitative. For example, each component described as being in an integrated form may be implemented in a distributed form. Likewise, components described as being in a distributed form may be implemented in an integrated form.

Functions provided in components and "sections" may be combined into a smaller number of components and "sections" or subdivided into additional components and "sections."

The scope of the present disclosure is defined by the attached claims, rather than the detailed description above. All modifications and variations derived from the meanings, scope, and equivalents of the claims should be construed as falling within the scope of the present disclosure.

What is claimed is:

1. A panoramic imaging apparatus comprising:
    a first camera module configured to capture a first omnidirectional image;
    a second camera module configured to be positioned a certain distance away from the first camera module and capture a second omnidirectional image;
    a controller configured to generate an image frame readable by a virtual reality device based on at least one of the first omnidirectional image and the second omnidirectional image, wherein the first omnidirectional image is optimized for a user's left eye and the second omnidirectional image is optimized for the user's right eye; and
    a sensor section configured to determine whether the sensor section is tilted toward a predetermined axis,
    wherein each of the first camera module and the second camera module includes two lenses having a viewing angle greater than or equal to 180°, sharing an optical axis, and formed to be convex in opposite directions to capture the omnidirectional image,
    wherein the controller generates the image frame using image information of a subject simultaneously acquired from the two lenses of at least one of the first camera module and the lenses of the second camera module, and
    wherein the controller sets an operation mode of the panoramic imaging apparatus to a first mode if the sensor section determines the first camera module and the second camera module are positioned at the same height from the ground, and the controller sets the operation mode of the panoramic imaging apparatus to a second mode if the sensor section determines that the first camera module and the second camera module are not positioned at the same height from the ground.

2. The panoramic imaging apparatus of claim 1, wherein each of the first camera module and the second camera module includes a plurality of imaging sections configured to be positioned to correspond to the two lenses included in the corresponding camera module and acquire information on images of the subject formed by the two lenses.

3. The panoramic imaging apparatus of claim 1, wherein the controller switches the operation mode of the panoramic imaging apparatus to any one of the first mode for generating an image frame constituting a binocular still cut image and the second mode for generating an image frame constituting a monocular still cut image.

4. The panoramic imaging apparatus of claim 3, wherein, in the second mode, the controller generates the image frame using the image information of the subject simultaneously acquired by any one of the first camera module and the second camera module.

5. The panoramic imaging apparatus of claim 1, further comprising:
    a housing configured to fix the first camera module and the second camera module at preset positions; and
    a set screw configured to be disposed at a certain position at the housing and engaged with a fixing hole of a tripod to fix a position of the panoramic imaging apparatus.

6. A panoramic imaging system including the panoramic imaging apparatus of claim 1, further comprising:
    an image processor configured to receive the image frame generated by the panoramic imaging apparatus from the panoramic imaging apparatus.

7. The panoramic imaging system of claim 6, wherein, when the image frame generated by the panoramic imaging apparatus in the first mode for generating a binocular image frame constituting a binocular still cut image is received, the image processor classifies image information of the subject included in the binocular image frame received from the panoramic imaging apparatus according to camera modules having acquired the image information, generates a first still cut image using the first omnidirectional image for the user's left eye acquired by the first camera module among the classified pieces of image information, and generates a second still cut image using the second omnidirectional image for the user's right eye acquired by the second camera module among the classified pieces of image information.

8. The panoramic imaging system of claim 6, wherein, when the image frame generated by the panoramic imaging apparatus in the second mode for generating a monocular image frame constituting a monocular still cut image is received, the image processor generates a first still cut image using one of the first omnidirectional image for the user's left eye and the second omnidirectional image for the user's right eye.

9. A method of generating a panoramic image in a panoramic imaging apparatus, the method comprising:
    receiving an operation mode;
    capturing an omnidirectional image based on the received operation mode; and
    generating an image frame readable by a virtual reality device based on image information of a subject acquired by capturing the omnidirectional image,
    wherein the panoramic imaging apparatus comprises:

a first camera module configured to capture a first omnidirectional image; and a second camera module configured to be positioned a certain distance away from the first camera module and capture a second omnidirectional image, a sensor section configured to determine whether the sensor section is tilted toward a predetermined axis, wherein the first omnidirectional image is optimized for a user's left eye and the second omnidirectional image is optimized for the user's right eye, wherein each of the first camera module and the second camera module includes two lenses formed in opposite directions, the generating of the image frame includes generating the image frame using at least one of the first omnidirectional image and the second omnidirectional image of the subject simultaneously acquired from the two lenses of the first camera module and the lenses of the second camera module, and the controller sets an operation mode of the panoramic imaging apparatus to a first mode if the sensor section determines that the first camera module and the second camera module are positioned at the same height from the ground, and the controller sets the operation mode of the panoramic imaging apparatus to a second mode if the sensor section determines that the first camera module and the second camera module are not positioned at the same height from the ground.

10. The method of claim 9, wherein the generating of the image frame comprises generating the image frame in the second mode based on the image information of the subject acquired by any one of the first camera module and the second camera module.

11. A non-transitory computer-readable recording medium in which a computer program for executing the method of claim 10 is recorded.

12. A non-transitory computer program for executing the method of claim 10 stored in a computer readable recording medium.

13. A non-transitory computer-readable recording medium in which a computer program for executing the method of claim 9 is recorded.

14. A non-transitory computer program for executing the method of claim 9 stored in a computer readable recording medium.

* * * * *